United States Patent
Zovi et al.

(10) Patent No.: US 12,540,251 B2
(45) Date of Patent: Feb. 3, 2026

(54) THERMOPLASTIC POLYMER POWDER FOR 3D PRINTING WITH IMPROVED RECYCLABILITY

(71) Applicant: Arkema France, Colombes (FR)

(72) Inventors: Ornella Zovi, Serquigny (FR); Arnaud Lemaitre, Serquigny (FR); Jean-Charles Durand, Serquigny (FR)

(73) Assignee: ARKEMA FRANCE, Puteaux (FR)

( * ) Notice: Subject to any disclaimer, the term of this patent is extended or adjusted under 35 U.S.C. 154(b) by 1108 days.

(21) Appl. No.: 17/282,891

(22) PCT Filed: Oct. 11, 2019

(86) PCT No.: PCT/FR2019/052419
§ 371 (c)(1),
(2) Date: Apr. 5, 2021

(87) PCT Pub. No.: WO2020/074840
PCT Pub. Date: Apr. 16, 2020

(65) Prior Publication Data
US 2021/0348008 A1    Nov. 11, 2021

(30) Foreign Application Priority Data

Oct. 11, 2018 (FR) .................................... 1859438

(51) Int. Cl.
*C09D 11/102* (2014.01)
*B33Y 70/00* (2020.01)
*C08K 5/37* (2006.01)

(52) U.S. Cl.
CPC ............ *C09D 11/102* (2013.01); *B33Y 70/00* (2014.12); *C08K 5/37* (2013.01)

(58) Field of Classification Search
CPC .......... C09D 11/102; B33Y 70/00; C08K 5/37
See application file for complete search history.

(56) References Cited

U.S. PATENT DOCUMENTS

| | | | |
|---|---|---|---|
| 7,229,272 B2 | 6/2007 | Leuterer et al. | |
| 9,643,359 B2 | 5/2017 | Baumann et al. | |
| 2004/0102539 A1 | 5/2004 | Monsheimer et al. | |
| 2004/0106691 A1 | 6/2004 | Monsheimer et al. | |
| 2006/0071359 A1 | 4/2006 | Monsheimer et al. | |
| 2009/0291308 A1 | 11/2009 | Pfister et al. | |
| 2017/0022349 A1* | 1/2017 | Mii | C08K 9/08 |

FOREIGN PATENT DOCUMENTS

| | | |
|---|---|---|
| CN | 104910616 A | 9/2015 |
| CN | 105238041 A | 1/2016 |
| EP | 1227131 A1 | 7/2002 |
| EP | 1227132 A1 | 7/2002 |
| EP | 1648686 B1 | 12/2009 |
| FR | 2867190 A1 | 9/2005 |
| FR | 2873380 A1 | 1/2006 |
| FR | 2930555 A1 | 10/2009 |
| JP | H0616929 A | 1/1994 |
| JP | 2002512645 A | 4/2002 |
| JP | 2007051237 A | 3/2007 |
| JP | 2010189610 A | 9/2010 |
| JP | 2015150781 A | 8/2015 |
| JP | 2018002944 A | 1/2018 |
| JP | 2018069681 A | 5/2018 |
| JP | 2018070674 A | 5/2018 |
| JP | 2018095880 A | 6/2018 |
| JP | 2019536909 A | 12/2019 |
| JP | 2020509137 A | 3/2020 |
| WO | 2009113590 A1 | 9/2009 |
| WO | 2009138692 A2 | 11/2009 |

OTHER PUBLICATIONS

English language machine translation of CN 105238041. (Year: 2016).*
International Search Report (PCT/ISA/210) and Written Opinion (PCT/ISA/237) mailed on Feb. 20, 2020, by the French Patent Office as the International Searching Authority for International Application No. PCT/FR2019/052419.
XP002792098, Thomas Scientific, London, GB, vol. 2016, No. 23, AN 2016-05556U, Retrieved from Database WPI 2017, 2 pages.
XP002792099, Thomson Scientific, London, GB, vol. 2016, No. 07, AN 2015-709313, Retrieved from: Database WPI, 2017, 4 pages.
XP002792100, Thomas Scientific, London, GB, vol. 1994, No. 08, AN 1994-062156, Retrieved from: Database WPI, 2017, 2 pages.
XP002792101, Heo, Min-Ho et al., "Discoloration and the effect of antioxidants on thermo-oxidative degradation of polyamide 6" retrieved from STN, abstract No. Database accession No. 2002:590783, Retrieved from CA, 2019, 1 page.
First Office Action with English translation mailed on Jul. 11, 2023, by the Japan Patent Office for Japenese Application No. 2021-519871, 23 pages.
Notice of Reasons for Rejection mailed on Mar. 14, 2023, by the Japan Patent Office for Japanese Application No. 2021-519871, 7 pages.
Patent Opposition (with English translation) issued on Feb. 26, 2020, by the Japanese Patent Office (JPO) in Japanese Patent No. 7541001, 256 pages.

\* cited by examiner

*Primary Examiner* — Angela C Scott
(74) *Attorney, Agent, or Firm* — Boone IP Law

(57) ABSTRACT

A powder intended for 3D printing, based on thermoplastic polymer, wherein it contains at least 0.1% by weight of at least one thioether antioxidant relative to the total weight of powder. Also, a process for stabilizing the color of a powder based on polymer in a 3D printing process, in which at least 0.1% by weight of at least one thioether antioxidant is incorporated relative to the total weight of powder.

11 Claims, No Drawings

THERMOPLASTIC POLYMER POWDER FOR 3D PRINTING WITH IMPROVED RECYCLABILITY

OBJECT OF THE INVENTION

The present invention relates to the manufacture of thermoplastic polymer powders, notably polyamide, which can be recycled several times in 3D printing processes.

TECHNICAL BACKGROUND

For the purposes of the invention, the term "3D printing" or "additive manufacturing" means any process for the volume manufacturing of parts by addition or agglomeration of powder, layer by layer. The agglomeration of powders by melting (hereinafter "sintering") is brought about by radiation, for instance a laser beam (laser sintering), infrared radiation, UV radiation, or any source of electromagnetic radiation which makes it possible to melt the powder layer by layer in order to manufacture three-dimensional objects. The technology for manufacturing objects layer by layer is notably described in patent application WO 2009/138692 (pages 1 to 3).

For the purposes of the invention, the term "3D printing" or "additive manufacturing" also means selective sintering technologies using an absorber, notably the technologies known under the names "High Speed Sintering" (HSS) and "Multi-Jet Fusion" (MJF). In these technologies, the 3D manufacture of objects is also performed layer by layer starting with a digital file, the process using a powder (for example a polymer) which is melted in a controlled manner for each layer constituting the 3D object: an absorber is deposited on the layer (for example by means of a liquid ink in the "inkjet process") before exposing the layer to electromagnetic radiation (for example infrared) which brings about melting of the zones containing said absorber. For example, patents U.S. Pat. No. 9,643,359 and EP 1648686 describe such processes.

3D printing is generally used to produce prototypes, models of parts ("rapid prototyping") or to produce finished parts in small series ("rapid manufacturing"), for example in the following fields: automobile, nautical, aeronautical, aerospace, medical (prostheses, hearing systems, cell tissues, etc.), textiles, clothing, fashion, decoration, electronic housing, telephony, home automation, computers, lighting, sport, industrial tools.

In the present description, the term "sintering" includes all these processes, irrespective of the type of radiation. Even if, in the text that follows, reference is usually made to the laser sintering process, everything that is written regarding laser sintering is, needless to say, valid for the other sintering processes.

The polyamide powders used in sintering typically have a volume-median diameter D50 in the range from 5 to 200 µm.

In sintering processes, it is recommended to use a polyamide for which the difference between the first-heating melting point Tf1 and the crystallization temperature Tc is as large as possible to avoid deformation phenomena, and for which the enthalpy of fusion ΔHf is as high as possible to obtain a good geometrical definition of the manufactured parts. This makes it possible to increase the working window with the polyamide powder and to make it much easier to implement in a sintering process. Processes for obtaining such powders are notably described in FR2867190, FR2873380 and FR2930555. Preferably, the difference Tf1−Tc of the PA powders used in sintering is within the range from 30° C. to 50° C.

For sintering processes, such as laser sintering, it is also preferred to use polyamide powder having the following properties:

The molecular mass of the powder in the solid state is preferably sufficiently low, i.e. having an inherent viscosity in solution of less than 2, both so that the melting of the grains does not require too much energy and so that the inter-grain coalescence is sufficient during the passage of the radiation so as to obtain an object with the least possible porosity, with good mechanical properties.

The powder when it is molten must be able to rise in viscosity, to reach a sufficient molecular mass, and to ensure a viscosity in solution of the part of greater than 1.5, so that the part (3D object) has acceptable mechanical properties.

Typically, in the case of polyamide, and in particular of polyamide 11, for the purposes of the present invention, the term "acceptable mechanical properties" preferably means:
 a tensile modulus of greater than 1500 MPa;
 an elongation at break of greater than 40%,
 a breaking stress of greater than 40 MPa, preferably greater than 45 MPa;
for objects constructed in X/Y, i.e. predominantly manufactured in the two horizontal dimensions or "flat" in the sintering device; these mechanical properties all being measured according to the standard ISO 527-1B: 2012.

In the course of each construction, also known as a "run", a large portion of the powder is not used: for example, in laser sintering, about 85% of the powder is not targeted by the laser. It is thus advantageous to be able to reuse, i.e. to recycle, this powder during the next construction (or next "run"). The polyamide powder should have conserved its initial properties as much as possible: particle size, flowability, color, in particular the yellowness index (YI), viscosity, physicochemical properties.

It is seen that certain polyamide powders require modified parameters for the sintering device, in particular a drastic increase in the radiation power, on each recycling of the powder during successive runs. In addition, a very marked decline in the mechanical properties of the parts obtained is gradually observed in the course of the runs: for example, the tensile modulus is increasingly low, passing below the threshold of 1300 MPa as early as the second run, and the elongation at break passes below 15% as early as the fourth run.

During a sintering construction, the surrounding powder, i.e. the powder not touched by the radiation, remains for several hours above its crystallization temperature Tc, which may entail an increase in the molecular mass and thus in the viscosity of the polyamide. Thereafter, coalescence between powder grains becomes increasingly difficult in the course of the successive runs. These problems are notably mentioned in paragraphs [0012] and [0013] of patent US 2006/071359.

Several solutions have already been proposed in an attempt to control or limit these changes in molecular mass of the powder in the solid state.

US 2004/102539 proposes the addition of chain limiters, by supplying carboxylic groups in excess during the polymerization of polyamide 12.

US 2004/106691 proposes the use of metal soaps (0.5%) supplemented with polyamide powder. However, when they are in contact with certain solvents, the objects manufactured from these powders have a tendency to leach out metal salt derivatives, which restricts their use to certain applications.

US 2006/071359 mentions in paragraph [0015] the drawbacks of the solutions described in the two abovementioned documents. The parts obtained by LS have an insufficient elongation at break (less than 10%). This is thought to be due to the fact that the increase in molecular mass of the constituent polyamide of the parts is insufficient to allow acceptable mechanical properties. To solve this problem, US 2006/071359 proposes a blend of polyamides bearing diacid chain ends and of polyamides bearing diamine chain ends. On paper, this process may seem to be close to the ideal solution: In the solid state, i.e. for the powder which does not see the laser, there is no reaction between the polyamide bearing diacid ends and the polyamide bearing diamine ends, and thus no increase in the molecular mass of the initial powder. In theory, the powder would thus be 100% recyclable. In the molten state (i.e. for the powder which constitutes the part undergoing construction), the diacid PA and diamine PA blend reacts and rises in molecular mass, ensuring that correct mechanical properties are obtained.

US 2009/291308 indicates several drawbacks of these polyamide blends bearing controlled diacid chain ends and of polyamide bearing controlled diamine chain ends, in particular in paragraph [0006] of said document: The user is in fact obliged to use this specific powder with properties different from the powder usually used in sintering processes, and this powder does not meet the requirements in terms of process conditions and of products obtained by laser sintering.

Another solution for improving the recyclability of the polyamide powder is described in U.S. Pat. No. 7,229,272, which concerns a method for treating spent powder by liquefaction, in which the powder is passed into a fluid. However, this process is not sufficiently efficient and, as such, at a high content of recycled powder (greater than 80% by weight), surface defects are observed, such as the "orange peel" effect, i.e. a coarse surface on the object obtained by sintering, this being confirmed by US 2009/0291308 in paragraph [0005].

The process claimed in US 2009/0291308 consists in treating the powder used in the preceding run before recycling said treated powder in a subsequent run. The treatment) consists in placing a polyamide in water or steam at high temperature (130 to 150° C.) to hydrolyze it and thus to reduce its molecular mass. The final molecular mass is controlled by modifying the treatment time and temperature. This process requires, between two successive runs, and in proximity to the sintering device, treatment of the powder with steam and drying it. This process which requires numerous intermediate steps between the runs is not economically viable.

The aim of the present invention is thus to provide powders that are easy to implement and recyclable several times, i.e. at least three times, preferably at least five times, or better still at least 10 times, with, for each cycle or construction or "run", a content of recycled powder of at least 50%, preferably of at least 60%, preferably of at least 70% by weight, relative to the total weight of powder used in the machine on each run, in sintering processes, and which generate objects that have acceptable and reproducible mechanical properties.

In other words, apart from the first run which uses 100% of fresh powder, each following run reuses at least 50%, preferably at least 60%, preferably at least 70% by weight of powder from the preceding run which has not been sintered, relative to the total weight of powder used in the machine on each run.

For the purposes of the present invention, the term "reproducible mechanical properties" means mechanical properties, notably tensile modulus, elongational at break and breaking stress, which each remain at least greater than 90% of their value measured for an object of the same form constructed by 3D printing from fresh powder.

In the present description, it is pointed out that when reference is made to ranges, expressions of the type "ranging from . . . to . . . " or "including/comprising from . . . to . . . " include the limits of the range. Conversely, expressions of the type "between . . . and . . . " exclude the limits of the range.

Unless otherwise mentioned, the percentages expressed are mass percentages. Unless otherwise mentioned, the parameters to which reference is made are measured at atmospheric pressure and at room temperature (23° C.).

The invention is now described in detail and in a non-limiting manner in the description that follows.

DESCRIPTION OF THE INVENTION

The Applicant has now found that the use of at least one thioether antioxidant in a polymer powder, notably polyamide, makes it possible to stabilize the color of the powder, notably its whiteness when it is white, in particular by limiting its yellowing.

Advantageously, this may also make it possible to increase to a stable value the inherent viscosity of the unsintered (and thus reusable) polymer powder in a sintering process, said viscosity notably being in the range from 1.5 to 2.

Advantageously also, the Applicant also realised that, surprisingly, the process according to the invention can make it possible simultaneously:

to increase the inherent viscosity of an unsintered (and thus reusable) polymer powder, such as polyamide, during its first passage in a sintering process (the first run of a powder), and to curb the change in molecular mass of the powder in the solid state when it is not yet sintered, i.e. when it is not concerned by the construction of the 3D object, during runs which follow the first run of an unsintered powder.

This makes it possible to recycle the unsintered powder and to obtain objects with mechanical properties that are acceptable and reproducible in the course of the runs.

One subject of the present invention is thus a powder intended for 3D printing, notably in a sintering process, which advantageously has improved recyclability, based on thermoplastic polymer, which incorporates at least 0.1% by weight of at least one thioether antioxidant relative to the total weight (100%) of powder (polymer+thioether antioxidant). Preferably, the polymer is based on polyamide, said polyamide preferably being obtained from hydrolytic polycondensation. Preferably also, said thioether antioxidant has a melting point below 140° C., preferably below 100° C., preferably below 90° C., preferably below 70° C.

A subject of the present invention is also a process for increasing and then stabilizing the inherent viscosity or for stabilizing the color of a powder based on thermoplastic polymer in a 3D printing process, in which at least 0.1% by weight of at least one thioether antioxidant is incorporated relative to the total weight of powder, said thioether preferably having a melting point below 120° C., 110° C., 100° C., 90° C., 80° C. or 70° C.

A subject of the present invention is also the use of at least one thioether antioxidant for stabilizing the color of a powder intended for 3D printing, based on thermoplastic polymer.

The present invention also relates to a 3D printing process using a powder intended for 3D printing as defined above.

Preferably, the 3D printing process is a sintering process, brought about by radiation, for example a laser beam (laser sintering), infrared radiation or UV radiation, with or without an absorber.

The present invention also relates to a manufactured article obtained via the 3D printing process as defined above.

The invention also relates to a process for manufacturing an article by sintering using a powder intended for 3D printing as defined above, in which the unsintered powder is recovered and reused.

The invention also relates to an article manufactured using a powder recovered according to the process as defined above.

According to another aspect, a subject of the invention is the use of at least one thioether antioxidant for improving the recyclability of a powder intended for 3D printing, based on thermoplastic polymer.

Advantageously, according to the invention, the color of the powder intended for 3D printing is stabilized by the addition of the thioether antioxidant.

As understood herein, a color is said to be stabilized when the color of the powder intended for 3D printing comprising the thioether antioxidant varies less in the course of its aging, notably in the course of successive runs in a 3D printing process, than an identical powder not comprising any thioether antioxidant. In particular, when the color of the powder is white, the addition of the thioether antioxidant stabilizes the whiteness of the powder. More particularly, the addition of the thioether antioxidant makes it possible to limit the yellowing, notably measured by the yellowness index (YI) of the powder. Thus, preferably, the yellowness index of a powder according to the invention, or prepared according to the invention, exposed to air at a temperature of 180° C. in a volume of about 50 mL is less than 15, notably less than 10 after 48 hours and is less than 45, notably less than 30 after 72 hours.

Moreover, said composition according to the invention makes it possible in particular to increase and to stabilize the inherent viscosity of a polymer, such as polyamide, which is unused or "unsintered" during the first run, and notably at a viscosity within the range from 1.5 to 2, which is very advantageous for the recycling of this polyamide in a sintering process since it ultimately makes it possible to obtain 3D parts which have efficient mechanical properties.

The hydrolytic polycondensation is induced by water at high temperature. For example, the hydrolytic polycondensation of lactams consists in opening the lactam with water and then in heating under pressure to polymerize. Optionally, a catalyst such as phosphoric acid may also be used in the hydrolytic process.

The thermoplastic polymer that may be used according to the invention is chosen from: polyolefin, polyethylene, polypropylene, polyvinyl chloride, polyacetal, polystyrene, polyimide, polysulfone, poly(N-methylmethacrylimide), polymethyl methacrylate, polyvinylidene fluoride, ionomer, polyether ketone, polyaryl ether ketone, polyamide, polyether, polyester, polydimethylsiloxane, polycarbonate and mixtures thereof in the form of alternating, statistical or block copolymers.

The polyamide that may be used in the composition and/or in the process of the invention may be a homopolyamide or a copolyamide. It may be a blend of polyamide and of at least one other polymer, the polyamide forming the matrix and the other polymer(s) forming the dispersed phase.

Advantageously, the polyamide is in divided form such as powder or granules. The granules may then be ground to make powders.

For the purposes of the invention, the term "polyamide" means the products of condensation:
- of one or more amino acids, such as aminocaproic acid, 7-aminoheptanoic acid, 11-aminoundecanoic acid and 12-aminododecanoic acid of one or more lactams such as caprolactam, enantholactam and lauryllactam;
- of one or more salts or mixtures of diamines, such as hexamethylenediamine, decanediamine, dodecamethylenediamine, meta-xylylenediamine, bis(p-aminocyclohexyl)methane and trimethylhexamethylenediamine with diacids such as isophthalic acid, terephthalic acid, adipic acid, azelaic acid, suberic acid, sebacic acid and dodecanedicarboxylic acid. Examples of polyamides that may be mentioned include PA 6, PA 6.6, PA 10.10, PA 11 and PA 12.

Copolyamides may also be used. Mention may be made of copolyamides resulting from the condensation of at least two different monomers, for example of at least two different α,ω-aminocarboxylic acids or of two different lactams or of one lactam and of one α,ω-aminocarboxylic acid of different carbon number. Mention may also be made of copolyamides resulting from the condensation of at least one α,ω-aminocarboxylic acid (or a lactam), at least one diamine and at least one dicarboxylic acid. Mention may also be made of copolyamides resulting from the condensation of an aliphatic diamine with an aliphatic dicarboxylic acid and at least one other monomer chosen from aliphatic diamines different from the preceding one and aliphatic diacids different from the preceding one.

The standard NF EN ISO 1874-1: 2011 defines a nomenclature for polyamides. The term "monomer" in the present description of polyamide-based powders should be taken in the sense of a "repeating unit". The case where a repeating unit of the polyamide consists of the combination of a diacid with a diamine is particular. It is considered that it is the combination of a diamine and of a diacid, that is to say the "diamine-diacid", also called "XY", pair, in equimolar amount, which corresponds to the monomer. This is explained by the fact that, individually, the diacid or the diamine is only a structural unit, which is not enough by itself alone to form a polymer.

As examples of diamine X, mention may be made of aliphatic diamines containing from 6 to 12 atoms, it also being possible for the diamine X to be aryl and/or saturated cyclic. Examples that may be mentioned include hexamethylenediamine, piperazine, tetramethylenediamine, octamethylenediamine, decamethylenediamine, dodecamethylenediamine, 1,5-diaminohexane, 2,2,4-trimethyl-1,6-diaminohexane, polyol diamines, isophoronediamine (IPD), methylpentamethylenediamine (MPDM), bis(aminocyclohexyl)methane (BACM), bis(3-methyl-4-aminocyclohexyl)methane (BMACM), meta-xylylenediamine, bis(p-aminocyclohexyl)methane and trimethylhexamethylenediamine.

As examples of diacid (or dicarboxylic acid) Y, mention may be made of acids containing between 4 and 18 carbon atoms. Examples that may be mentioned include adipic acid, sebacic acid, azelaic acid, suberic acid, isophthalic acid, butanedioic acid, 1,4-cyclohexyldicarboxylic acid, terephthalic acid, the sodium or lithium salt of sulfoisophthalic acid, dimerized fatty acids (these dimerized fatty acids have a dimer content of at least 98% and are preferably hydrogenated) and dodecanedioic acid HOOC—(CH$_2$)$_{10}$—COOH.

The lactam or amino acid monomers are said to be of "Z" type:

As example of lactams, mention may be made of those containing from 3 to 12 carbon atoms on the main ring and which may be substituted. Examples that may be mentioned include β,β-dimethylpropiolactam, α,α-dimethylpropiolactam, amylolactam, caprolactam, capryllactam, enantholactam, 2-pyrrolidone and lauryllactam.

As examples of amino acid, mention may be made of α,ω-amino acids, such as aminocaproic, 7-aminoheptanoic, 11-aminoundecanoic, n-heptyl-11-aminoundecanoic and 12-aminododecanoic acids.

Preferably, the polyamide-based powders of the invention comprise at least one polyamide chosen from polyamides and copolyamides comprising at least one of the following XY or Z monomers: 46, 4T, 54, 59, 510, 512, 513, 514, 516, 518, 536, 6, 64, 69, 610, 612, 613, 614, 616, 618, 636, 6T, 9, 104, 109, 1010, 1012, 1013, 1014, 1016, 1018, 1036, 10T, 11, 12, 124, 129, 1210, 1212, 1213, 1214, 1216, 1218, 1236, 12T, MXD6, MXD10, MXD12, MXD14, and mixtures thereof, in particular chosen from PA 11, PA 12, PA 1010, PA 6, PA 6/12, PA 11/1010, and mixtures thereof.

As examples of copolyamides, mention may be made of copolymers of caprolactam and of lauryllactam (PA 6/12), copolymers of caprolactam, of adipic acid and of hexamethylenediamine (PA 6/12/66), copolymers of caprolactam, of lauryllactam, of 11-aminoundecanoic acid, of azelaic acid and of hexamethylenediamine (PA 6/66), copolymers of caprolactam, of lauryllactam, of adipic acid and of hexamethylenediamine (PA 6/69/11/12), copolymers of caprolactam, of lauryllactam, of 11-aminoundecanoic acid, of adipic acid and of hexamethylenediamine (PA 6/66/11/12), copolymers of lauryllactam, of azelaic acid and of hexamethylenediamine (PA 69/12), copolymers of 11-aminoundecanoic acid, of terephthalic acid and of decamethylenediamine (PA 11/10T).

Blends of polyamides may be used. These are, for example, blends of aliphatic polyamides and of semiaromatic polyamides and blends of aliphatic polyamides and of cycloaliphatic polyamides.

Examples that may be mentioned include the transparent compositions described in patent application EP 1227131, comprising on a weight basis, the total being 100%:
 5% to 40% of an amorphous polyamide (B) which results essentially from the condensation:
  either of at least one diamine chosen from cycloaliphatic diamines and aliphatic diamines and of at least one diacid chosen from cycloaliphatic diacids and aliphatic diacids, at least one of these diamine or diacid units being cycloaliphatic,
  or of a cycloaliphatic α,ω-aminocarboxylic acid,
  or of a combination of these two possibilities,
  and optionally of at least one monomer chosen from α,ω-aminocarboxylic acids or the optional corresponding lactams, aliphatic diacids and aliphatic diamines,
 0 to 40% of a flexible polyamide (C) chosen from copolymers bearing polyamide blocks and polyether blocks and copolyamides,
 0 to 20% of a compatibilizer (D) for (A) and (B),
 0 to 40% of a flexible modifier (M),
 with the condition that (C)+(D)+(M) is between 0 and 50%,
 the remainder to 100% of a semicrystalline polyamide (A).

Mention may also be made of the transparent compositions described in patent application EP 1227132, comprising on a weight basis, the total being 100%:
 5% to 40% of an amorphous polyamide (B) which results essentially from the condensation of at least one optionally cycloaliphatic diamine, of at least one aromatic diacid and optionally of at least one monomer chosen from: α,ω-aminocarboxylic acids, aliphatic diacids, aliphatic diamines,
 0 to 40% of a flexible polyamide (C) chosen from copolymers bearing polyamide blocks and polyether blocks and copolyamides,
 0 to 20% of a compatibilizer (D) for (A) and (B),
 (C)+(D) is between 2% and 50%,
 with the condition that (B)+(C)+(D) is not less than 30%,
 the remainder to 100% of a semicrystalline polyamide (A).

It would not constitute a departure from the context of the invention to replace a portion of the polyamide with a copolymer bearing polyamide blocks and polyether blocks, i.e. to use a mixture comprising at least one of the preceding polyamides and at least one copolymer bearing polyamide blocks and polyether blocks.

The copolymers bearing polyamide blocks and polyether blocks result from the copolycondensation of polyamide blocks bearing reactive ends with polyether blocks bearing reactive ends, such as, inter alia:

1) polyamide blocks bearing diamine chain ends with polyoxyalkylene blocks bearing dicarboxylic chain ends;
2) polyamide blocks bearing dicarboxylic chain ends with polyoxyalkylene blocks bearing diamine chain ends obtained by cyanoethylation and hydrogenation of α,ω-dihydroxylated aliphatic polyoxyalkylene blocks known as polyether diols;
3) polyamide blocks bearing dicarboxylic chain ends with polyether diols, the products obtained being, in this particular case, polyetheresteramides. These copolymers are advantageously used.

The polyamide blocks bearing dicarboxylic chain ends originate, for example, from the condensation of α,ω-aminocarboxylic acids, lactams or dicarboxylic acids and diamines in the presence of a chain-limiting dicarboxylic acid.

The polyether may be, for example, a polytetramethylene glycol (PTMG). The latter is also known as polytetrahydrofuran (PTHF).

The number-average molar mass of the polyamide blocks is between 300 and 15 000 and preferably between 600 and 5000 g/mol. The molar mass of the polyether blocks is between 100 and 6000 and preferably between 200 and 3000 g/mol.

The polymers bearing polyamide blocks and polyether blocks may also comprise randomly distributed units. These polymers may be prepared by the simultaneous reaction of the polyether and of the precursors of the polyamide blocks.

For example, polyether diol, a lactam (or an α,ω-amino acid) and a chain-limiting diacid may be reacted in the presence of a small amount of water. A polymer is obtained essentially bearing polyether blocks and polyamide blocks of very variable length, but also the various reagents that have reacted randomly, which are distributed randomly along the polymer chain.

The polyether diol blocks are either used in unmodified form and copolycondensed with polyamide blocks bearing carboxylic end groups, or they are aminated to be converted into polyetherdiamines and condensed with polyamide blocks bearing carboxylic end groups. They may also be blended with polyamide precursors and a chain limiter to make polymers bearing polyamide blocks and polyether blocks having randomly distributed units.

The ratio of the amount of copolymer bearing polyamide blocks and polyether blocks to the amount of polyamide is advantageously between 1/99 and 15/85 by weight.

As regards the blend of polyamide and of at least one other polymer, it is in the form of a blend with a polyamide matrix and the other polymer(s) form the dispersed phase.

Examples of this other polymer that may be mentioned include polyolefins, polyesters, polycarbonate, PPO (abbreviation for polyphenylene oxide), PPS (abbreviation for polyphenylene sulfide) and elastomers.

The polyamide, whether or not as a blend with at least one other polymer, may contain fillers, pigments, antioxidants, notably combined with the thioether antioxidant used according to the invention, and UV stabilizers.

The powder intended for 3D printing based on thermoplastic polymer may also comprise an antioxidant other than the thioether antioxidant.

As examples of antioxidants other than the thioether antioxidant used according to the invention, mention may be made of phenolic antioxidants intended for combating the thermal oxidation of the polyamides, such as 3,3'-bis(3,5-di-tert-butyl-4-hydroxyphenyl)-N,N'-hexamethylenedipropionamide notably sold under the name Palmarole AO.OH.98 by Palmarole, (4,4'-butylidenebis(2-t-butyl-5-methylphenol) notably sold under the name Lowinox 44B25 by Addivant, pentaerythrityl tetrakis(3-(3,5-di-tert-butyl-4-hydroxyphenyl)propionate) notably sold under the name Irganox® 1010 by BASF, N,N'-hexane-1,6-diylbis(3-(3,5-di-tert-butyl-4-hydroxyphenylpropionamide)) notably sold under the name Irganox® 1098 by BASF, 3,3',3',5,5',5'-hexa-tert-butyl-a,a',a'-(mesitylene-2,4,6-triyl)tri-p-cresol notably sold under the name Irganox® 1330 by BASF, ethylenebis(oxyethylene)bis(3-(5-tert-butyl-4-hydroxy-m-tolyl)propionate) notably sold under the name Irganox® 245 by BASF, 1,3,5-tris(3,5-di-tert-butyl-4-hydroxybenzyl)-1,3,5-triazine-2,4,6(1H,3H,5H)-trione notably sold under the name Irganox® 3114 by BASF, N'N'-(2-ethyl-2'-ethoxyphenyl)oxanilide notably sold under the name Tinuvin® 312 by BASF, 4,4',4"-trimethyl-1,3,5-benzenetriyl)tris(methylene)] tris[2,6-bis(1,1-dimethylethyl)]phenol notably sold under the name Alvinox® 1330 by 3V, Hostanox 245 FF, Hostanox 245 Pwd, sold by Clariant, pentaerythrityl tetrakis(3-(3,5-di-tert-butyl-4-hydroxyphenyl)propionate) notably sold under the names Evernox 10 and Evernox 10GF by Everspring Chemical Company Limited, octadecyl 3-(3,5-di-tert-4-hydroxyphenyl)propionate notably sold under the names Evernox 76 and Evernox 76GF by Everspring Chemical Company Limited, tetrakis[methylene-3-(3',5'-di-tert-butyl-4-hydroxyphenyl)propionate]methane notably sold under the name BNX® 1010 by Mayzo, thiodiethylenebis[3-(3,5-di-tert-butyl-4-hydroxyphenyl)propionate] notably sold under the name BNX® 1035 by Mayzo, tetrakis[methylene-3-(3',5'-di-tert-butyl-4-hydroxyphenyl)propionate]methane, octadecyl 3-(3,5-di-tert-butyl-4-hydroxyphenyl)propionate notably sold under the name BNX® 2086 by Mayzo, 1,3,5-tris(3,5-di-tert-butyl-4-hydroxybenzyl)-1,3,5-triazine-2,4,6(1H,3H,5H)trione notably sold under the name BNX® 3114 by Mayzo.

According to one embodiment, when the powder of the invention comprises a mixture of antioxidants, the thioether antioxidant is preferably present at more than 50% by weight, for example more than 55% by weight in the mixture of antioxidants, typically more than 58%, for example more than 70%, for example from 50% to 70%, preferably from 50% to 65% by weight in the mixture of antioxidants.

The process of the invention is particularly useful for polyamides chosen from PA 11, PA 12, aliphatic polyamides resulting from the condensation of an aliphatic diamine containing from 6 to 12 carbon atoms and of an aliphatic diacid containing from 9 to 12 carbon atoms and copolyamides 11/12 containing either more than 90% of units 11 or more than 90% of units 12.

As examples of aliphatic polyamides resulting from the condensation of an aliphatic diamine containing from 6 to 12 carbon atoms and of an aliphatic diacid containing from 9 to 12 carbon atoms, preference is notably given to PA 612 resulting from the condensation of hexamethylenediamine and of 1,12-dodecanedioic acid; PA 912 resulting from the condensation of C9 diamine and of 1,12-dodecanedioic acid; PA 1010 resulting from the condensation of C10 diamine and of 1,10-decanedioic acid; PA 1012 resulting from the condensation of C10 diamine and of 1,12-dodecanedioic acid.

As regards the copolyamides 11/12 containing either more than 90% of units 11 or more than 90% of units 12, they result from the condensation of 11-aminoundecanoic acid with lauryllactam (or C12 α,ω-amino acid).

It would not constitute a departure from the scope of the invention to use a blend of polyamides.

The thioether antioxidant according to the invention is preferably selected from: dilauryl thiodipropionate (DLTDP), ditridecyl thiodipropionate (DTDTDP), distearyl thiodipropionate (DSTDP), dimyristyl thiodipropionate (DMTDP), pentaerythrityl tetrakis(3-dodecylthiopropionate or 3-laurylthiopropionate), 3,3'-thiodipropionate, (C12-14) alkyl thiopropionate, dilauryl 3,3'-thiodipropionate, ditridecyl 3,3'-thiodipropionate, dimyristyl 3,3'-thiodipropionate, distearyl 3,3'-thiodipropionate, dioctadecyl 3,3'-thiodipropionate, lauryl stearyl 3,3-thiodipropionate, tetrakis[methylene 3-(dodecylthio)propionate]methane, thiobis(2-tert-butyl-5-methyl-4,1-phenylene)bis(3-(dodecylthio)propionate), 2,2'-thiodiethylenebis(3-aminobutenoate), 4,6-bis(octylthiomethyl)-o-cresol, 2,2'-thiodiethylenebis 3-(3,5-tert-butyl-4-hydroxyphenyl)propionate, 2,2'-thiobis(4-methyl 6-tert-butylphenol), 2,2'-thiobis(6-tert-butyl-p-cresol), 4,4'-thiobis(6-tert-butyl-3-methylphenol), 4,4'-thiobis(4-methyl-6-tert-butylphenol), bis(4,6-tert-butyl-1-yl-2-) sulfides, tridecyl-3,5-di-tert-butyl-4-hydroxybenzyl thioacetate, 1,4-bis(octylthiomethyl)-6-phenol, 2,4-bis(dodecylthiomethyl)-6-methylphenol, distearyl disulfide, bis (methyl-4-3-n-(C12/ C14)alkyl thiopropionyloxy 5-tert-butylphenyl) sulfide, and mixtures thereof. More preferably, the thioether antioxidant according to the invention is selected from the group consisting of dilauryl thiodipropionate (DLTDP), ditridecyl thiodipropionate (DTDTDP), distearyl thiodipropionate (DSTDP), dimyristyl thiodipropionate (DMTDP), pentaerythrityl tetrakis(3-dodecylthiopropionate or 3-laurylthiopropionate), and mixtures thereof. More preferably, the thioether antioxidant according to the invention is DLTDP or pentaerythrityl tetrakis(3-dodecylthiopropionate).

Such antioxidants are notably sold by the companies Songnox or Adeka.

Preferably, said at least one thioether antioxidant represents at least 0.1%, preferably from 0.1% to 5%, preferably from 0.1% to 4%, preferably from 0.1% to 3%, preferably from 0.1% to 2%, preferably from 0.1% to 1%, relative to the total weight of powder representing 100%.

Typically, said at least one thioether antioxidant represents at least 0.2%, for example at least 0.3%, typically at least 0.4%, and typically less than 5%, for example less than 4%, preferably less than 3% of the total weight of powder representing 100%.

According to the invention, the thioether antioxidant as defined above is incorporated into the powder via any suitable method known to those skilled in the art, for example via at least one of the following methods: addition of thioether during the synthesis of the polyamide, notably at the start or at the end of the synthesis, by blending by compounding, during any step of a powder manufacturing process starting from said polyamide, notably by dissolution-precipitation of polyamide in a solvent containing the thioether, for example dispersed or dissolved in the solvent, or by dry blending with the powder intended for 3D printing.

Preferably, the composition according to the invention is in the form of a powder with a volume-median diameter (D50) in the range from 5 to 200 µm, preferably in the form of a powder with a D50 in the range from 10 to 150 µm.

The starting polymer, notably polyamide, used in the process and/or the composition of the invention is preferably in divided form, in the form of granules or of powder. It is preferably in the form of a powder with a D50 in the range from 10 to 150 µm, preferably from 30 to 80 µm. When polymer granules are used in the process according to the invention, they may, on conclusion of the process, be ground so as to obtain a powder with a D50 in the range from 10 to 150 µm.

The thioether according to the invention is preferably in powder form.

A subject of the present invention is also a process for manufacturing objects by agglomeration of polyamide powders by melting using radiation or a sintering process, the powders having a composition in accordance with that of the PA defined previously or resulting from a process in accordance with that described above. Any sintering device known in this field may be used, such as the devices sold by EOS, 3D Systems, Aspect, Trump Precision Machinery, Hewlett Packard, Sinterit, Sintratec, Sharebot, FormLabs, Sonda Sys, Farsoon, Prodways, Ricoh, Wematter3D, Voxel-Jet, Xaar, etc. Mention may notably be made of the machines EOSINT P396 or Formiga P100 from EOS GmbH.

A subject of the present invention is also a manufactured 3D article obtained by melting, using an electromagnetic radiation, of a powder. This article may be chosen from prototypes, models and parts, notably in the automobile, nautical, aeronautical, aerospace, medical (prostheses, hearing systems, cell tissues, etc.), textile, clothing, fashion, decoration, design, electronic housing, telephony, home automation, computer, lighting, sport and industrial tool sectors.

The parts manufactured by powder sintering, notably based on polyamide 11, according to the invention, with an inherent viscosity in solution of greater than 1.5 advantageously have a modulus of greater than 1500 MPa, an elongation at break of greater than 40% and a breaking stress of greater than 40 MPa, even after several recyclings (at least two recyclings) of the powder.

In the present description of the invention, including in the examples below:
- the D50, also referred to herein as the volume-median diameter, corresponds to the value of the particle size which divides the population of particles examined exactly in two. The D50 is measured according to the standard ISO 13320-1. In the present description, a Malvern Insitec particle sizer with RTSizer software is used to obtain the particle size distribution of the powder and to deduce the D50 therefrom;
- the inherent or intrinsic viscosity in solution (notably of the polyamide, of the powders or of the parts manufactured by sintering) is measured according to the standard ISO 307:2007 at a concentration of 0.5% by weight in solution in meta-cresol relative to the total weight of the solution, at a temperature of 20° C., using an Ubbelohde viscometer;
- the mechanical properties, notably the tensile modulus and the elongation at break, are measured according to the standard according to the standard ISO 527-1B: 2012;
- the analysis of the thermal characteristics of the polyamide is made by DSC according to the standard ISO 11357-3 "Plastics—Differential Scanning calorimetry (DSC) Part 3: Determination of temperature and enthalpy of melting and crystallization". The temperatures that more particularly concern the invention herein are the first-heating melting point (Tf1), the crystallization temperature (Tc) and the enthalpy of fusion;
- the yellowing is quantified by the yellowness index (YI) measured according to the standard ASTM E313-96 (D65), notably using a Konica Minolta spectrocolorimeter with the illuminant D65 at 10° in specular reflection included (SCI) mode.

EXAMPLES

Example 1

Materials Used:
Polymer: Polyamide (PA):
   powder of PA 11 synthesized by grinding a polymer obtained by polycondensation of 11-aminoundecanoic acid, mixed with a standard phenolic antioxidant for PA (Irganox 245 (BASF) at 0.3% or Palmarole AO.OH.98 Ultrafine (Palmarole) at 0.6% for the comparative example without antioxidant intended for combating aging).
Antioxidants Intended for Combating Aging:
   dilauryl thiodipropionate (DLTDP), sold by Songnox;
   pentaerythrityl tetrakis(3-dodecylthiopropionate), sold by Adeka;
   diphosphonite antioxidant, sold by Clariant (P-EPQ)
1.1—Evaluation of the Flowabilities at Room Temperature (23° C.) of the Two Formulations:

The flowability test consists in measuring the flow time of 150 g of powder through a funnel, according to the standard ISO 6186: 1998(E) Method A.

The test is performed on the powder at room temperature, the measurements are taken with a funnel with an aperture of 15 mm. The results are indicated in table 1 below:

TABLE 1

|  | Flowability at room temperature (time in seconds) Ø 15 mm |
| --- | --- |
| PA11 (viscosity 1.12) + 0.5% DLTDP | 30 s |
| PA11 (viscosity 1.12) + 0.5% pentaerythrityl tetrakis (3-dodecylthiopropionate) | 34 s |

1.2—Aging Test

The test consists in exposing the polyamide powder to a temperature 10 to 30° C. below the melting point Tf of the pure polyamide (from Tf−30° C. to Tf−10° C.) in a glass bottle placed in an air-ventilated oven, in particular at 180° C. in this example.

This test simulates the exposure conditions to which a powder may be subjected in a 3D machine, for 1 run or several runs, according to the exposure times.

The exposure times are from 0 to 90 hours, for example 48 hours (1 run), 72 hours (2 runs) (one bottle per sample withdrawn).

1.2-1 Yellowness Index (YI)

The measurements are taken on a Konica Minolta spectrocolorimeter with the illuminant D65 at 10° in SCI mode according to the standard ASTM YI (E313-96) (D65).

TABLE 2

| | YI | | |
|---|---|---|---|
| Examples according to the invention | | Comparative examples | |
| Thermoplastic polymer | | | |
| PA11 | PA11 | PA11 | PA11 |
| | Additive | | |
| 0.5% pentaerythrityl tetrakis(3-dodecylthiopropionate) | 0.5% DLTDP | — | 0.5% P-EPQ |
| $T_0$ 1.5 | 1.4 | 2.3 | 2.5 |
| 48 h 8.7 | 13.0 | — | |
| 72 h 28.7 | 40.6 | Measurement impossible | 48.1 |

The thioether antioxidant 3-dodecylthiopropionate is more efficient than the thioether antioxidant DLTDP in terms of preventing yellowing, which is itself more efficient than the diphosphonite antioxidant P-EPQ (non-thioether).

1.2-2 Inherent Viscosity of the PA Powder

The inherent viscosity is measured at 20° C., in solution at 0.5% by mass in meta-cresol according to the standard ISO 307:2007.

TABLE 3

| | Inherent viscosity | | |
|---|---|---|---|
| Examples according to the invention | | Comparative examples | |
| Thermoplastic polymer | | | |
| PA11 | PA11 | PA11 | PA11 |
| | Additive | | |
| 0.5% pentaerythrityl tetrakis(3-dodecylthiopropionate) | 0.5% DLTDP | — | 0.5% P-EPQ |
| $T_0$ 1.21 | 1.21 | 1.12 | 1.09 |
| 48 h 1.55 | 1.57 | — | |
| 72 h 1.44 | 1.37 | Measurement impossible | 0.89 |

The thioether antioxidant 3-dodecylthiopropionate is slightly more efficient than the antioxidant DLTDP. The performance qualities obtained with the two thioether antioxidants after 72 hours of aging are markedly better than those obtained for the diphosphonite antioxidant P-EPQ (non-thioether).

Example 2

Materials Used:
Polymer: Polyamide (PA):
  powder of PA 12 synthesized by grinding a polymer obtained by direct polymerization of lauryllactam mixed with a standard phenolic antioxidant for PA (Irganox 245 (BASF) at 0.3% for the example, or Lowinox 44B25 (Addivant) at 0.5% for the comparative example).
Antioxidants Intended for Combating Aging:
  pentaerythrityl tetrakis(3-dodecylthiopropionate), sold by Adeka.

The powder and the antioxidant are dry-blended.

Aging Test

The polyamide powder is exposed to a temperature of 170° C. in an oven (FGE 140) in air, for 72 hours.

2.1. Yellowness Index (YI)

The measurements are taken on a Konica Minolta spectrocolorimeter with the illuminant D65 at 10° in SCI mode according to the standard ASTM YI (E313-96) (D65).

TABLE 4

| YI | |
|---|---|
| Example according to the invention | Comparative examples |
| Thermoplastic polymer | |
| PA12 | PA12 |
| Additive | |
| 0.5% pentaerythrityl tetrakis(3-dodecylthiopropionate) | — |
| $T_0$ 1.7 | 2.4 |
| 72 h 11.2 | 12.2 |

2.2 Inherent Viscosity of the PA Powder

The inherent viscosity is measured at 20° C., in solution at 0.5% by mass in meta-cresol according to the standard ISO 307:2007.

TABLE 5

| Inherent viscosity | |
|---|---|
| Examples according to the invention | Comparative examples |
| Thermoplastic polymer | |
| PA12 | PA12 |
| Additive | |
| 0.5% pentaerythrityl tetrakis(3-dodecylthiopropionate) | — |
| $T_0$ 1.28 | 1.28 |
| 72 h 1.23 | 1.22 |

In summary, the process according to the invention, by controlling the nature and the amount of antioxidant in the polyamide powder that is employed during the first sintering construction, makes it possible to increase the recyclability of the powder, and to obtain a powder in which the change in color, notably the yellowing, and the change in molecular mass undergone by the powder not melted during each construction, were controlled beforehand in a simple manner in the powder that is employed during the first construction.

The invention claimed is:

1. A powder intended for 3D printing, the powder comprising a thermoplastic polymer and at least one thioether antioxidant,
wherein the powder comprises at least 0.1% by weight of at least one thioether antioxidant relative to the total weight of powder, and
wherein the at least one thioether antioxidant comprises pentaerythrityl tetrakis(3-dodecylthiopropionate or 3-laurylthiopropionate),
wherein the at least one thioether antioxidant is the only antioxidant present.

2. The powder as claimed in claim 1, in which said at least one thioether antioxidant represents from 0.1% to 5%, relative to the total weight of powder representing 100%.

3. The powder as claimed in claim 1, in which said thermoplastic polymer is chosen from: polyolefin, polyethylene, polypropylene, polyvinyl chloride, polyacetal, polystyrene, polyimide, polysulfone, poly (N-methylmethacrylimide), polymethyl methacrylate, polyvinylidene fluoride, ionomer, polyether ketone, polyaryl ether ketone, polyamide, polyether, polyester, polydimethylsiloxane, polycarbonate and mixtures thereof in the form of alternating, statistical or block copolymers.

4. The powder as claimed in claim 1, in which the thermoplastic polymer comprises at least one polyamide chosen from PA11, PA12, PA10.10, aliphatic polyamides resulting from the condensation of an aliphatic diamine containing from 6 to 12 carbon atoms and of an aliphatic diacid containing from 9 to 12 carbon atoms, and copolyamides 11/12 containing either more than 90% of units 11 or more than 90% of units 12.

5. The powder as claimed in claim 1, in which the thermoplastic polymer is in the form of a powder with a volume-median diameter D50 in the range from 10 to 150 µm.

6. The powder as claimed in claim 1, wherein the thermoplastic polymer comprises a copolyamide of polyamides 11 and 12 containing either more than 90% of units 11 or more than 90% of units 12.

7. A 3D printing process comprising utilizing the powder as claimed in claim 1.

8. A process for manufacturing an article comprising: sintering the powder as claimed in claim 1, recovering any unsintered powder, and reusing the unsintered powder.

9. A powder intended for 3D printing, based on a thermoplastic polymer, wherein the powder contains at least 0.1% by weight of at least one thioether antioxidant relative to the total weight of powder, and
wherein the at least one thioether antioxidant is chosen from: dilauryl thiodipropionate (DLTDP), ditridecyl thiodipropionate (DTDTDP), distearyl thiodipropionate (DSTDP), dimyristyl thiodipropionate (DMTDP), pentaerythrityl tetrakis(3-dodecylthiopropionate or 3-laurylthiopropionate) or mixtures thereof,
wherein the powder comprises an antioxidant mixture including the at least one thioether antioxidant, wherein the thioether antioxidant is more than 55% by weight of the antioxidant mixture.

10. A powder intended for 3D printing, based on a thermoplastic polymer, wherein the powder contains at least 0.1% by weight of at least one thioether antioxidant relative to the total weight of powder, and
wherein the at least one thioether antioxidant is chosen from: dilauryl thiodipropionate (DLTDP), ditridecyl thiodipropionate (DTDTDP), distearyl thiodipropionate (DSTDP), dimyristyl thiodipropionate (DMTDP), pentaerythrityl tetrakis(3-dodecylthiopropionate or 3-laurylthiopropionate) or mixtures thereof,
wherein the thermoplastic polymer comprises a copolyamide of polyamides 11 and 12 containing either more than 90% of units 11 or more than 90% of units 12.

11. A powder intended for 3D printing, the powder comprising a thermoplastic polymer and at least one thioether antioxidant,
wherein the powder comprises at least 0.1% by weight of at least one thioether antioxidant relative to the total weight of powder,
wherein the at least one thioether antioxidant comprises pentaerythrityl tetrakis(3-dodecylthiopropionate or 3-laurylthiopropionate), wherein the powder comprises an antioxidant mixture including the at least one thioether antioxidant, and wherein the at least one thioether antioxidant is more than 55% by weight of the antioxidant mixture.

* * * * *